Patented Jan. 14, 1936

2,027,361

UNITED STATES PATENT OFFICE 2,027,361

FOOD FLAVORING COMPOSITION

Arthur Alt, St. Louis, Mo., assignor to Monsanto Chemical Company, St. Louis, Mo., a corporation of Delaware No Drawing. Application October 16, 1933, Serial No. 693,832

3 Claims. (Cl. 99—11)

This invention relates to certain novel flavoring materials for use in the preparation of various foodstuffs including confectionery, bakery goods, preserves, ice cream, syrups, etc.

Heretofore vanillin has been utilized extensively in lieu of vanilla bean extract. For this purpose approximately 7–9 ounces of vanilla are dissolved in 2.5 gallons of alcohol which subsequently are diluted to 8–10 gallons. The water may previously have been sweetened by means of sugar or syrup. If desired, coumarin may be added in varying amounts for the purpose of modifying the flavor of the extract. Even with the addition of coumarin the flavoring composition is distinguishable from that obtained from the natural vanilla bean.

I have now found that the aralkyl ethers of protocatechuic aldehyde having the formula:

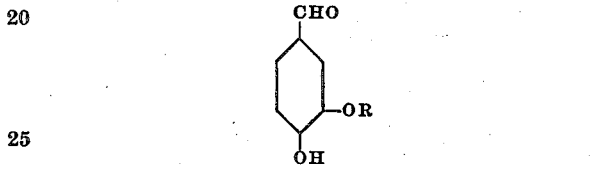

where R is an aralkyl group, impart a pleasant flavor which may be used in lieu of vanillin or vanilla beans and which imparts a taste suggestive not only of vanilla beans but of fruit, practicularly berries such as raspberries and blackberries. I have also found that the flavoring imparting ability of these materials is substantially greater than that of vanillin and may be blended advantageously with vanillin or vanilla bean extract to fortify as well as improve the flavor thereof. Thus, whereas 7–9 ounces of vanillin are required to make 8–12 gallons of extract, when using the benzyl ether of protocatechuic aldehyde one need employ only approximately .3–.35 ounces to obtain substantially the same flavoring power. This inordinate flavoring power is wholly unexpected since the material is practically void of fragrance as compared to ordinary vanillin.

A flavoring composition may be prepared according to my invention by dissolving .3–.4 ounces of the meta benzyl ether of protocatechuic aldehyde (melting point 114°–115° C.) in 2.5 gallons of grain alcohol. The resulting solution is diluted to ten gallons with water which may previously have been sweetened by dissolving therein 15 pounds of sugar. 1–2 ounces of coumarin may be added to the grain alcohol before dilution if desired.

A blended flavor results when one-half of the benzyl ether derivative is replaced by 4.–4.5 ounces of vanillin. The resulting flavor simulates more closely vanilla bean extract than vanillin itself.

The various aralkyl ethers of protocatechuic aldehyde may be employed including the benzyl ether referred to above, the phenyl ethyl ether and the methyl substituted benzyl ethers as, for example, the tolyl ether having the formula:

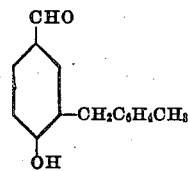

The compositions contemplated herein may be made by various methods. One method involves first the preparation of the mono aralkyl ether of catechol which, subsequently, is condensed according to the Geigy reaction (D. R. P. 105,798) with formaldehyde. In order to improve the solubility of the ether in this reaction it is desirable that the aqueous reacting medium contain a quantity of solubilizing reagent such as alcohol or ether. The resulting condensation product is refined and purified by methods analogous to those employed in the preparation of vanillin.

Another method of preparing the compositions consists in forming an ester such as the benzene sulfonic acid ester of protocatechuic aldehyde wherein the benzene sulfonic acid group is joined to the hydroxyl group which is in the para position with respect to the aldehyde group, and subsequently reacting the free hydroxyl group with an aralkylating agent such as benzyl chloride or its homologues including the methyl substituted benzyl chloride and the like. The resulting product is saponified whereby the sulfonic acid radical is split off and the aralkyl ether of protocatechuic aldehyde obtained (U. S. P. 543,193).

Other methods of preparing these compounds may be employed if desired without departing from the spirit of this invention which contemplates the utilization of specific ether derivatives of protocatechuic aldehyde as flavorings for foodstuffs. Similarly, other proportions of the active flavoring constituents, as well as other solvents therefor, may be employed.

What I claim is:

1. A flavoring composition for foodstuffs embodying a material having the following structural formula:

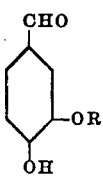

where R is an aralkyl group.

2. A flavoring composition for foodstuffs embodying a material having the following structural formula:

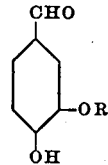

where R is a benzyl group.

3. A flavoring composition for foodstuffs embodying a material having the following structural formula:

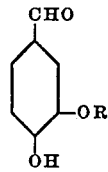

where R is an aralkyl group, vanillin and a solvent therefor.

ARTHUR ALT.